United States Patent [19]

Anderson et al.

[11] 3,941,150

[45] Mar. 2, 1976

[54] FLOW CONTROL STRUCTURE

[75] Inventors: Frank R. Anderson, Hacienda Heights; Albert J. Castro, Cudahy, both of Calif.

[73] Assignee: Westates Space-Era Products, Inc., S. El Monte, Calif.

[22] Filed: May 31, 1974

[21] Appl. No.: 474,931

[52] U.S. Cl. ............................................. 137/504
[51] Int. Cl.² ...................................... F16K 31/363
[58] Field of Search ............ 137/504; 251/120, 121, 251/122

[56] References Cited
UNITED STATES PATENTS

| | | | |
|---|---|---|---|
| 780,986 | 1/1905 | Francis .............................. | 137/504 |
| 2,224,216 | 12/1940 | Coberly ............................. | 137/504 |
| 3,472,275 | 10/1969 | Castro et al. ..................... | 137/504 X |
| 3,496,962 | 2/1970 | Tuzson............................... | 137/504 |
| 3,518,831 | 7/1970 | Tibbals, Jr. et al. ............ | 137/504 X |
| 3,805,824 | 4/1974 | Robbins, Jr........................ | 137/504 |

FOREIGN PATENTS OR APPLICATIONS

| | | | |
|---|---|---|---|
| 75,483 | 4/1930 | Sweden.............................. | 137/504 |

*Primary Examiner*—Martin P. Schwadron
*Assistant Examiner*—Robert J. Miller
*Attorney, Agent, or Firm*—Edward D. O'Brian

[57] ABSTRACT

A flow control structure which is primarily intended to be utilized as a pressure compensating emitter in agricultural watering or irrigation can be constructed utilizing a housing having a flow control member located therein. The housing employed has an internal cylinder connected by a passage leading to a valve seat. The flow control member extends from the cylinder to adjacent to the valve seat. The extremity of the flow control member within the cylinder is formed as a piston so that the flow control member may be moved by fluid pressure. A channel means connects this first extremity of the flow control member with the interior of the passage at a point which is adjacent to and spaced from the other extremity of the flow control member. This other extremity is shaped so as to cooperate with the valve seat in order to limit flow between this other extremity and the valve seat in accordance with the position of the flow control member.

1 Claim, 11 Drawing Figures

U.S. Patent   March 2, 1976   Sheet 1 of 2   3,941,150
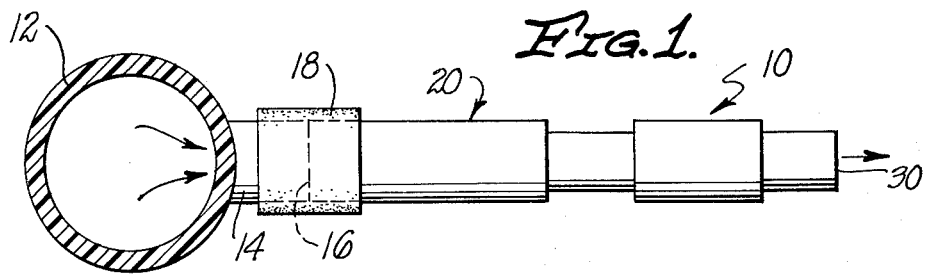
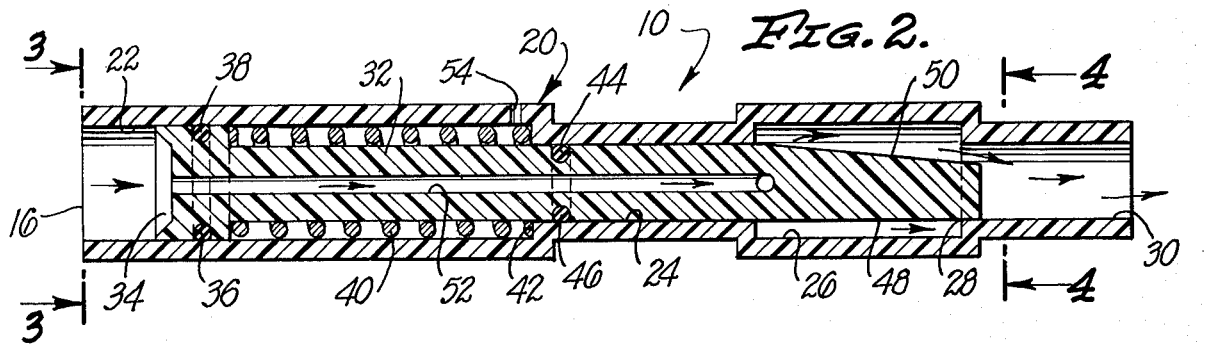
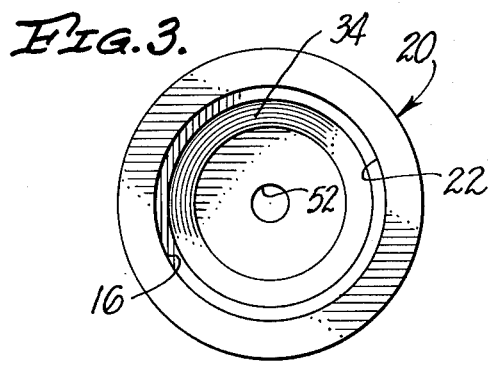 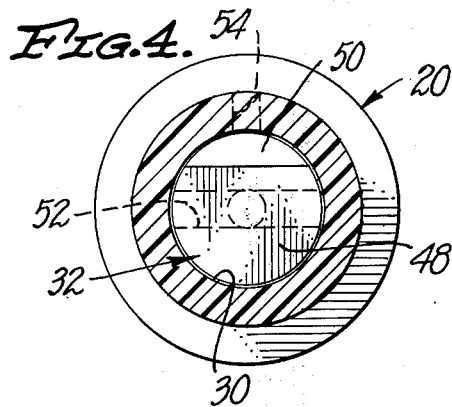
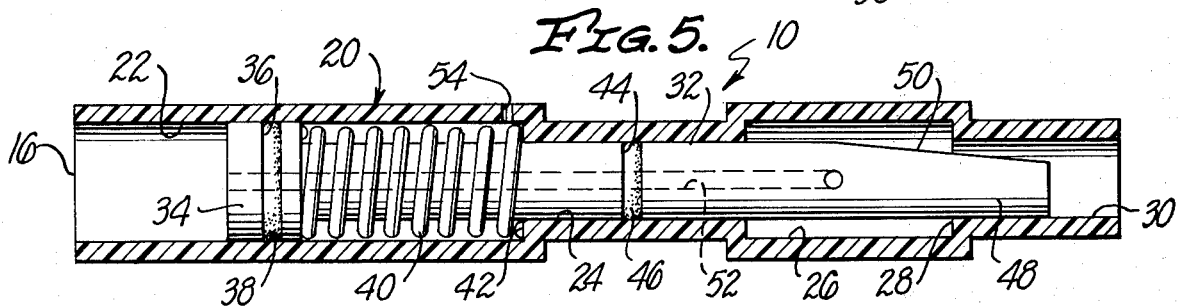
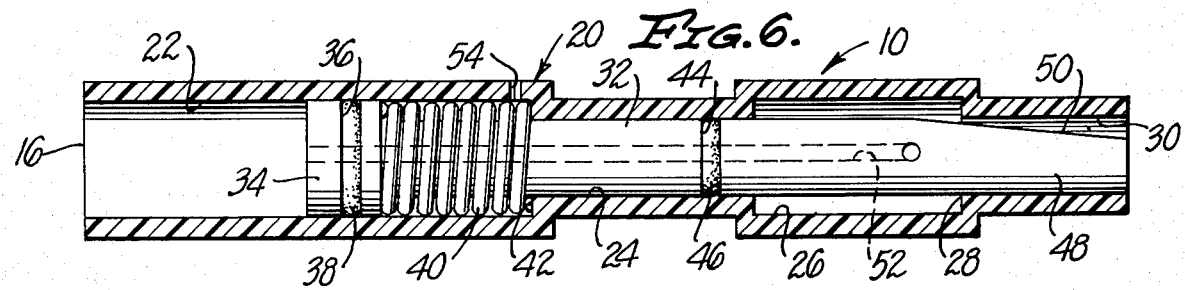

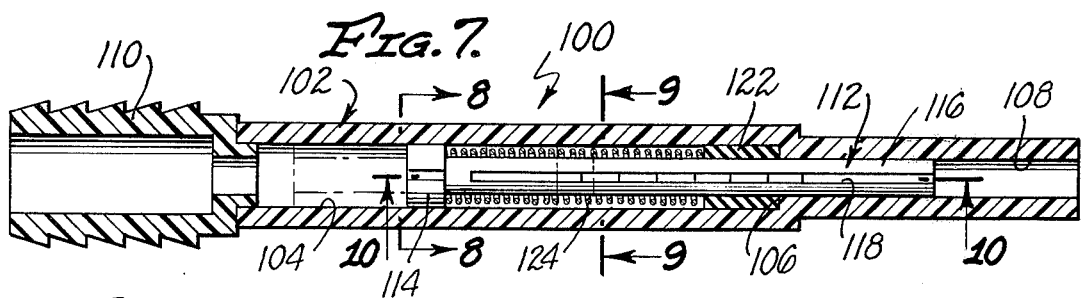
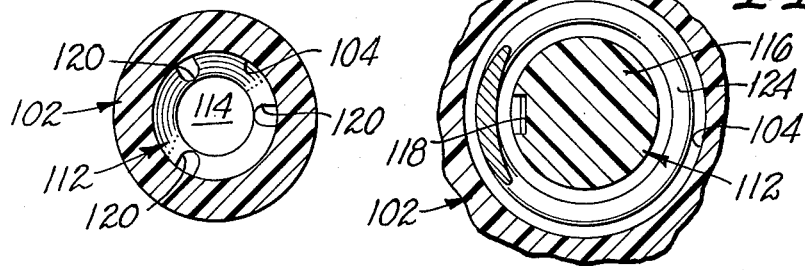
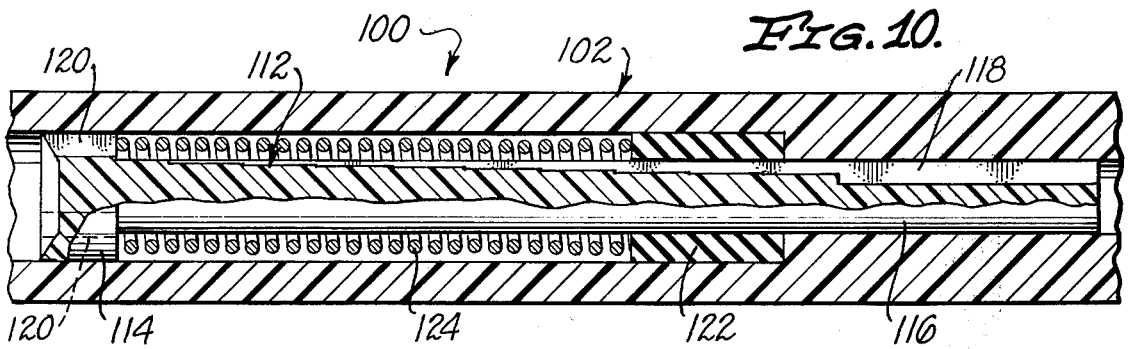
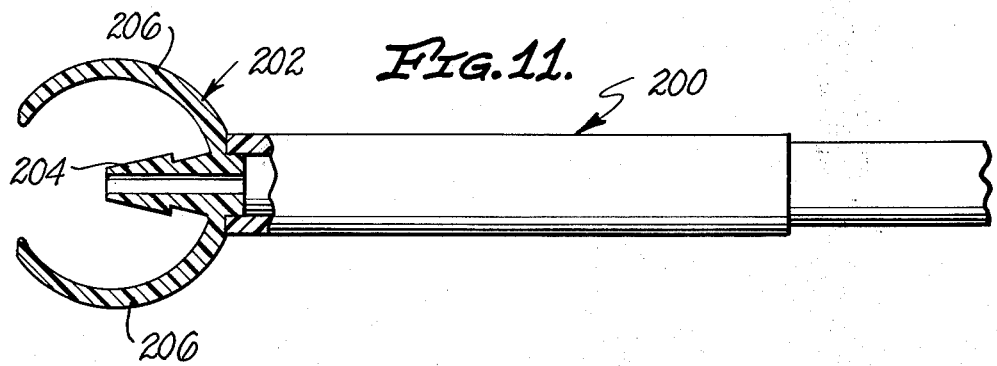

FLOW CONTROL STRUCTURE

BACKGROUND OF THE INVENTION

The invention set forth in this specification relates to what may be referred to as a flow control structure. Such a structure is primarily intended to be utilized as a compensating emitter in agricultural applications. Such structures are intended to discharge a substantially uniform quantity of water as required in agricultural watering or irrigation regardless of whether or not there are changes in the pressure of water supplied to the emitter from a principal distribution conduit. The structures within the scope of the invention can obviously be employed for other than agricultural uses wherever it is desired to dispense a substantially uniform quantity of liquid from a conduit in which liquid may be at various different pressures.

An indication such as the preceding of the nature of flow control structures of the present invention unfortunately does little to clearly delineate the reasons as to why the flow control structures of the invention are important and significant. These reasons primarily relate to agricultural watering or irrigation procedures. Within comparatively recent times the distribution of water in order to promote plant growth has undergone significant changes. Increasingly it has been recognized that it is most economical and effective to distribute measured amounts of water to individual plants or small areas through appropriate conduits and to emit such quantities of water at a limited control rate.

As an elongated conduit is used in distributing water the pressure of the water will vary at various points along the length of the conduit. In part, this is due to the usual considerations relative to fluid flow. Frequently such variation will be a consequence of a conduit extending at different elevations. Thus, for example, when a distribution conduit goes up and down hill it is to be expected that the pressure of water within the conduit will vary at various points along the length of the conduit. In addition, when such a conduit is used to distribute water at various locations along its length, the pressures at various distribution points will also be influenced by the amount of liquid emitted from the conduit at such points.

These factors are considered to make it desirable to utilize in agricultural watering or irrigation flow control structures which will dispense controlled, substantially uniform quantities of water, regardless of the internal pressure within a distribution conduit as indicated in the preceding discussion. Prior efforts at providing such structures are considered to have been substantially unacceptable for any one of a variety of reasons. It is not considered that an understanding of this invention requires a detailed discussion relative to all of such reasons. A number of factors including costs, effectiveness, ease of installation, reliability and the like all relate to the acceptability of a flow control structure.

SUMMARY OF THE INVENTION

An object of the present invention is to provide new and improved flow control structures. More specifically the invention is intended to provide structures of this type which are expected to be utilized as compensating emitters in agricultural or related type watering or irrigation procedures. Another objective of the invention is to provide structures as indicated which are pressure responsive so as to be capable of emitting or delivering expected quantities of water or other liquids in accordance with the pressure of a fluid in a supply conduit.

Other objectives of the present invention are to provide flow control structures or compensating emitters for purposes as previously indicated: which are relatively simple to manufacture and/or construct; which are relatively inexpensive; which may be easily and conveniently installed in an operative location; and which are capable of giving relatively prolonged, reliable service for their intended purposes with a minimum of attention and maintenance.

In accordance with this invention these objectives are achieved by providing a flow control structure which includes: a housing having an internal cylinder, an internal valve seat, an internal passage connecting the valve seat and the cylinder, an inlet leading into the extremity of the cylinder remote from the passage and the valve seat, and an outlet leading from the side of the valve seat remote from the passage and the cylinder. A flow control member is located within the housing so as to extend from the interior of the cylinder to adjacent to the valve seat; the extremity of the flow control member within the cylinder is formed so as to serve as a piston while the other extremity of the flow control member is shaped so as to cooperate with the valve seat in order to regulate the fluid flow between the valve seat of the flow controlling member. A channel means is provided for conveying fluid from within the inlet end of the cylinder to within the passage means adjacent to the valve seat. Spring means are also provided so as to bias the flow control member generally towards the inlet so that the pressure of fluid entering the inlet will move the flow control member against the spring relative to the valve seat in order to achieve flow control regulation.

BRIEF DESCRIPTION OF THE DRAWING

Unfortunately a summary such as the preceding cannot accurately indicate many facets and features of an invention. Further details of the invention and various further advantages of the invention will be apparent from a careful consideration of the remainder of this specification, the appended claims and the accompanying drawing in which:

FIG. 1 is a somewhat diagrammatic view indicating a flow control structure of the present invention in use;

FIG. 2 is a cross sectional view of the flow control structure shown in FIG. 1;

FIG. 3 is a cross sectional view taken at line 3—3 of FIG. 2;

FIG. 4 is a cross sectional view taken at line 4—4 of FIG. 2;

FIGS. 5 and 6 are cross sectional views corresponding to FIG. 2 in which various internal parts are shown in elevation showing different operative positions;

FIG. 7 is a cross-sectional view similar to FIG. 2 of a modified flow control structure in accordance with the invention;

FIG. 8 is a cross-sectional view taken at line 8—8 of FIG. 7;

FIG. 9 is a cross-sectional view taken at line 9—9 of FIG. 7;

FIG. 10 is a cross-sectional view taken at line 10—10 of FIG. 7 in which a part of an element illustrated is broken away so that a portion of this element is shown in section; and FIG. 11 is an elevational view of a flow control structure in accordance with this invention used with a means of securing the flow control structure to a tube or conduit, these means being shown in segments.

DETAILED DESCRIPTION

In the drawing there is shown a flow control structure or compensating emitter 10 which is intended to be utilized in conveying a liquid such as water (not separately numbered) from the interior of a supply or distribution conduit 12. This conduit 12 is provided with a small lateral 14 connected to an inlet end 16 of the emitter 10 by means of a conventional small coupling 18. It is considered that normally this coupling 18 will merely be a short length of an elastomeric tube.

The emitter 10 utilizes an elongated rigid housing 20 which is provided with an internal cylinder 22, one end of which is open to the inlet end 16. The other end of the cylinder 22 is connected to an aligned internal cylindrical passage 24 which in turn leads to a second aligned, enlarged passage 26. In effect, the passages 24 and 26 can be regarded as a single passage or passage means leading from the cylinder 22 to an internal valve seat 28 of a cylindrical configuration. An outlet 30 is provided on a housing 20 to lead from the valve seat 28 away from the passage 26. This outlet 30 may, if desired, be connected to a distribution tube or conduit (not shown).

Within the interior of the housing 20, there is located an elongated, rigid flow control member 32. This member 32 extends from within the cylinder 22 through the passages 24 and 26 to a sufficient extent so as to traverse the valve seat 28 to a short distance. The extremity 34 of the member 32 within the cylinder 22 may be referred to as a piston since it is enlarged so as to serve as a piston. Preferably a groove 36 is provided around the periphery of the piston 34 to hold an "O" ring 38 so that this "O" ring 38 seals against the interior of the cylinder 22. With this structure the piston 34 in effect serves as an enlarged "head."

A coil spring 40 is located around the member 33 within the cylinder 22 so as to bear against the piston 34 and a small shoulder 42 located at the end of the cylinder 22 around the passage 24. Preferably a groove 44 is located around the flow control member 32 generally within this passage 24 so as to hold another "O" ring 44 in such a manner that a seal is formed between the flow control member 32 and the interior of the passage 24 at all times.

The extremity 48 of the flow control member 32 adjacent to the valve seat 28 is preferably shaped so that as the flow control member 32 is moved during the operation of the emitter 10 the amount of space between this extremity 48 and the interior of the valve seat 28 will be varied. In the particular emitter 10 shown, this result is achieved by forming what may be referred to as a sloping notch or notch means 50 on the extremity 48. Various other equivalent means of accomplishing this objective can be achieved, as an example of this entire extremity 48 can be formed to be of a somewhat conical or bullet-like shape.

It will be realized from the aforegoing that as fluid is applied under pressure at the inlet end 16 that this fluid will exert pressure against the piston 34 so as to tend to move the flow control member 32 against the pressure of the spring coil 40 in order to vary the effective area between the valve seat 28 and the extremity 48. With the present invention, a channel or channel means 52 is provided leading through the piston 34 and the flow control member 32 to adjacent the extremity 48 within the passage 26 so that this variation is spacing can be utilized to regulate flow through the emitter 10.

This channel 52 may conveniently be located as shown within the center portion of the flow control member 32. Obviously, however, the channel 52 may be formed in other manners so as to convey liquid from the inlet end 16 to within the passage 26 adjacent to the valve seat 28. Thus, for example, the channel 52 can be located in the periphery of the flow control member 32 so as to extend across the piston 32 and along the principal part of the length of this flow control member 32. Similarly, the channel 52 may be a separate conduit within the housing 20 extending as described. Also the channel 52 can be replaced by a separate conduit located so as to extend between the portions of the housing 20 described in the preceding along the exterior of the housing 20. For economic reasons this is considered undesirable.

It is believed that the operation of the emitter 10 will be reasonably apparent from the preceding. As a fluid such as water is supplied to the inlet end 16 under pressure this fluid will exert pressure against the extremity 34 of the flow control member 32 so as to move this flow control member 32 away from the inlet end 16. Preferably a small vent hole 54 extends through the wall of the cylinder 22 so as to prevent air being trapped in such a manner as to oppose this motion.

As the fluid is supplied in this manner and as the flow control member 32 moves, some of the fluid will flow through the channel 52 within the piston 34 to within the passage 26. Such fluid will then pass through the interior of the valve seat 28 to the extent that such flow is permitted by the relative position of the extremity 48 with respect to the valve seat 28. The extent of such flow will thus be dependent upon the location of the notch means 50 relative to the valve seat 28. When the inlet pressure is decreased the piston 34 will be moved by the force of the spring 40 back towards the inlet 16.

Thus, with the structure illustrated, the quantity of fluid which will pass through the emitter 10 will vary in accordance with the inlet fluid pressure and will increase in accordance with the decreases of such inlet fluid pressure. The extremity 48 can be constructed so that various different quantities of fluid will be emitted in response to different applied pressures. Normally, it is considered to be preferable to form the extremity 48 so as to provide an essentially linear response to pressure changes in an applied fluid. For agricultural uses it is considered that it is best if the extremity 48 is constructed so that the total quantity of a fluid passing through the outlet 30 will remain constant regardless of the pressure of the fluid at the inlet 16.

In FIGS. 7 to 10 of the drawing there is shown a modified emitter 100 which is closely related to the emitter 10 as previously described. This emittr 100 uses an elongated, rigid housing 102 having an internal cylinder 104 separated by a shoulder 106 from an outlet or outlet cylinder 108. A conventional fitting 110 may be secured to the housing 104 at the end of the cylinder 104 so as to act as a retainer to hold a flow control member 112 within the housing 102.

This flow control member 112 includes a piston or piston like head 114 formed so as to fit closely within the interior of the cylinder 104 and an elongated shank 116 which extends from the piston 114 past the shoulder 106 into the outlet 108. This shank 116 is provided with an internal groove 118 which gradually increases in depth (and thus in total cross-sectional configuration) as it progresses along the shank 116 away from the piston 114. A plurality of channels or grooves 120 are also provided in the piston 114 so as to extend the length of this piston 114 adjacent to the interior of the cylinder 104. If desired these grooves 120 may be considered as passages.

The emitter 100 also preferably includes a small sleeve 122 located within the interior of the cylinder 104 adjacent to the shoulder 106. In a sense it may be regarded that this sleeve 122 acts both as a bearing for the shank 116 which serves to control fluid flow so that any flow into the outlet 108 is through the groove 118 and not around the periphery of the shank 116 and as a valve seat. A small coil spring 124 is located around the shank 116 between the sleeve 122 and the piston 114. This spring 124 normally biases the flow control member 112 towards the inlet fitting 110.

The operation of the emitter 100 is similar to the operation of the emitter 10. As fluid under pressure is conveyed to the emitter 100 through the fitting 110 the piston 114 will be moved to the right against the pressure of the spring 124. Concurrently the interior of the cylinder 104 adjacent to the flow control member 112 will serve as an internal passage for fluid flow towards the outlet 108. This in turn will regulate the flow through the groove or notch 118 to the outlet 108 in accordance with the applied fluid pressure. This groove 118 may be shaped so that different quantities of fluid are passed or emitted at different pressures. Preferably, however, the groove or notch 118 is constructed so that substantially a constant flow through the emitter 100 will occur regardless of the applied fluid pressure.

The emitters 10 and 100 can be connected to a tube or conduit for a fluid under pressure such as a water line (not shown) in a variety of ways. In FIG. 11 there is shown an emitter 200 corresponding to either of the emitters 10 or 100 previously described secured to an inlet fitting 202 which is designed to be directly attached to a tube or conduit. This fitting 202 includes a centrally located, conventional nipple 204 which is constructed so that it may be past through an opening in such a tube and flexible, resilient arms 206 carried by the nipple 204 which are adapted to fit more than 180° around such a tube so as to secure or hold it in place relative to the nipple 204.

We claim:

1. A flow control structure for use in dispensing a fluid from a conduit in accordance with the pressure of the fluid within the conduit which comprises:

an elongated, rigid housing having an internal cylinder, an outlet cylinder of smaller diameter than said internal cylinder and a shoulder separating said internal and said outlet cylinders, said cylinders being aligned with one another, a flow control member located within said housing so as to extend from the interior of said internal cylinder past said shoulder into said outlet cylinder, said flow control member including a piston fitting closely within the interior of said internal cylinder and an elongated shank extending from said piston past said shoulder into said outlet cylinder, said shank fitting closely within said outlet cylinder, said flow control being linearly movable within said housing, a groove means for conveying fluid located within said shank and extending along the length of said shank to the end of said shank remote from said piston, said groove means increasing in total cross-sectional configuration as it extends away from said piston, a sleeve located around said shank within said outer cylinder and against said shoulder, said sleeve forming a seal against the exterior of said shank and stabilizing said flow control member against other than linear movement, inlet means on the extremity of said housing remote from said outlet cylinder for retaining said flow control member within said housing, said means comprising a fitting for securing said housing to said conduit, passage means leading through said piston between the sides thereof, spring means for biasing said flow control member generally away from said outlet cylinder so that the pressure of fluid entering said inlet means will move the flow control member against the pressure of the spring means in order to achieve flow control regulation in accordance with the pressure of the fluid within the conduit, said spring means comprising a coil spring located around said shank within said internal cylinder and between said sleeve and said piston, said groove means being shaped so that said structure passes a substantially uniform quantity of fluid regardless of the pressure of the fluid supplied to the inlet of said structure.

* * * * *

UNITED STATES PATENT OFFICE
CERTIFICATE OF CORRECTION

PATENT NO. : 3,941,150
DATED : MARCH 2, 1976
INVENTOR(S) : FRANK R. ANDERSON and ALBERT J. CASTRO It is certified that error appears in the above-identified patent and that said Letters Patent are hereby corrected as shown below:

The following sentence should appear at the end of the Abstract: --A spring means is used to bias the flow control member to a position where any increase in the pressure of fluid within a conduit connected to the end of the cylinder remote from the passage will serve to move the flow control member generally towards the valve seat.--

Column 4, line 3, "is" should read --in--.

Column 4, line 57, "emittr" is misspelled and should read --emitter--.

Signed and Sealed this twenty-ninth Day of June 1976

[SEAL]

Attest:

RUTH C. MASON
*Attesting Officer*

C. MARSHALL DANN
*Commissioner of Patents and Trademarks*